United States Patent [19]

Keyes

[11] 4,455,753

[45] Jun. 26, 1984

[54] THICKNESS GAUGE

[76] Inventor: Barry E. Keyes, Box 97, New Preston, Conn. 06777

[21] Appl. No.: 353,348

[22] Filed: Mar. 1, 1982

[51] Int. Cl.³ ............................ G01B 3/20; G01B 5/02
[52] U.S. Cl. ..................................... 33/143 E; 33/162
[58] Field of Search ............ 33/143 R, 143 E, 143 M, 33/162, 169 R, 169 B, 173

[56] References Cited

U.S. PATENT DOCUMENTS

| | | | |
|---|---|---|---|
| 1,715,405 | 6/1929 | Bull | 33/143 E |
| 2,073,281 | 3/1937 | Maier | 33/162 |
| 2,265,234 | 12/1941 | Jensen | 33/162 |
| 2,555,453 | 6/1951 | Mennie | 33/143 R |
| 3,529,699 | 9/1970 | Smith | 33/162 |

FOREIGN PATENT DOCUMENTS

| | | | |
|---|---|---|---|
| 98192 | 7/1898 | Fed. Rep. of Germany | 33/143 E |
| 577276 | 5/1958 | Italy | 33/162 |
| 22365 | of 1897 | United Kingdom | 33/162 |
| 707427 | 4/1954 | United Kingdom | 33/162 |

Primary Examiner—Richard R. Stearns

[57] ABSTRACT

An inexpensive thickness gauge for measuring thickness through holes prepared for the installation of fasteners, or at an edge of sheet material to determine thickness of individual or stacked sheets for various purposes. The gauge is comprised of two major components constructed from thin sheet material which are so shaped and so move with respect to one another as to provide a novel device which provides magnified readings, durable construction, compactness, and direct reading in fastener grip dash numbers, wire gages, sheet metal gages, etc.

2 Claims, 4 Drawing Figures

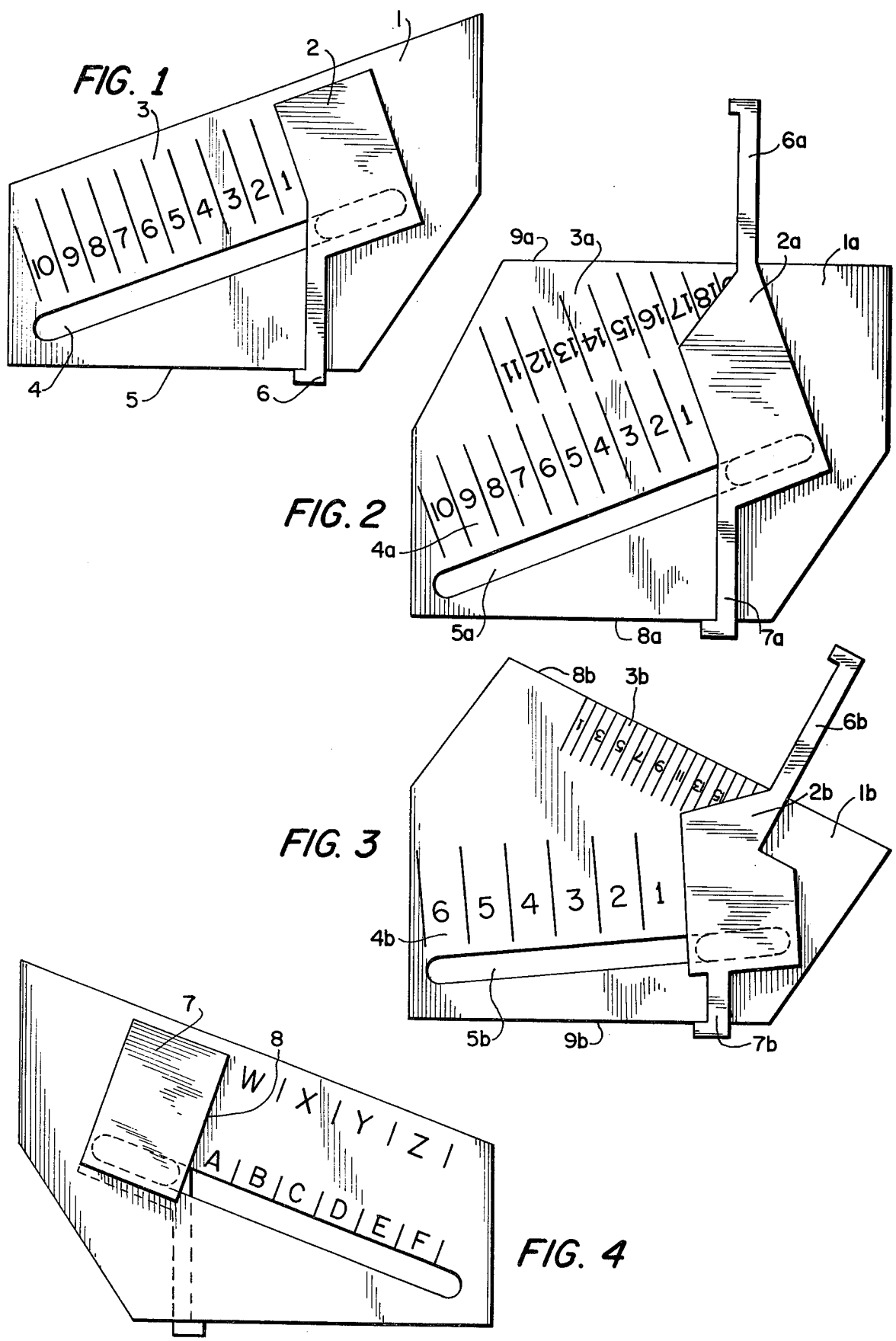

THICKNESS GAUGE

SUMMARY

This invention relates to thickness measuring devices and more particularly to devices which measure thickness through holes prepared for the installation of fasteners, and at an edge of sheet material to determine thickness of individual or stacked sheets for various purposes. The type of gauge to which the present invention is applicable is comprised of two major components constructed from sheet material which are so shaped and so move with respect to one another as to provide a novel device which is rugged, compact, easily read, and has improved overall accuracy of measurement over existing devices.

Measuring thickness of structure through holes or at edges so that proper length fasteners may be selected for installation is a frequent requirement during construction of aircraft, missiles, and the like. In many instances correct selection is critical. Existing gauges for the purpose fall into three general categories: (1) Hook gauges sold by individual fastener manufacturers, usually calibrated in approximately 1/16 inch graduations they are difficult to read and provide little accuracy particularly when used through countersunk holes for grip measurement. (2) Micrometer head with hook anvil. These are expensive and bulky and difficult and slow to use. They require the gauge reading to be converted to fastener grip dash number by use of a conversion chart. (3) Dial indicators. They are expensive, fragile, and also require conversion of reading.

Hook gauges are calibrated only for the fastener they were designed for. By their nature they can contain only two scalesone on each side of the hook. Most different fasteners have different grip increments and starting points. For example, the following aerospace fasteners are cited: NAS1398D6-1 has a grip range of 0.032–0.062". NAS1919BO4-01 is 0.025–0.062". NAS1921BO4-01 is 0.057–MS90353-06-01 is 0.031–0.095". The last dash number in all cases is the grip dash number. It can be seen that a special gage is needed for most different fastener types.

In view of the shortcomings of existing devices for the purpose, it is an object of this invention to provide an inexpensive, compact, durable gauge which is high accuracy, is easily read in production shop or field service use, reads, fastener grip number directly, and has the capacity to handle a variety of grip scales on one gauge. It is another object of this invention to provide the capacity for various gauge configurations within the framework of the basic gauge which can satisfy a variety of User's special requirements. These include but are not limited to, multiple scales on the same gauge (including fastener grip number scales, metric or inch fractional or decimal scales, scales not related to fastener grip selection, etc.), varying degrees of scale magnification, multiple hook gauges, etc.

DESCRIPTION OF INVENTION

The invention resides in the relative motion of one gauge component with respect to the other so as to magnify the reading for ease of use and increased accuracy, the use of the body of the gauge for placement of the scale thus permitting multiple scales on the same gauge, the use of the body of the gauge as a perpendicular reference point, the construction of the gauge minimize cost, and the shape of the gauge which permits great accuracy in a novel way while maintaining compact size and the capacity to suit the requirements of a variety of uses.

BRIEF DESCRIPTION OF THE DRAWING

FIG. 1 is a side elevational view of a single hook gauge employing one measureing scale.

FIG. 2 is a similar view of a double hook gauge with additional measuring capacity.

FIG. 3 is a similar view of a double hook gauge with two different scale magnifications.

FIG. 4 is a similar view showing the reverse side of the gauge of FIG. 1 except that an additional component allows additional scales to be utilized.

FIG. 1 is an elevational view of the basic gauge embodying the present invention. Frame (1) with integral scale (3) and slot (4) is fitted with slide (2) having integral hook (6), providing a close sliding fit between the two major components throughout the slot length. Both the frame and slide are constructed from sheet material nominally 0.030" thick. The angle of the slot (4) with respect to surface (5) determines the amount of scale magnification with respect to the grip measuring motion of hook (6). In practive, the gauge is held between the thumb and forefinger and extended toward maximum grip. The hook is engaged at the bottom of material thickness to be measured and the slide is moved until it fetches up. The gauge can be read in place or removed and read. FIG. 1 depicts a gauge with a 30 degree angle of slot yielding a two-times scale magnification. (Sine 30 is 0.5) The gauge depicted is shown at approximately two times actual size and is intended primarily for measuring material thickness of sheet metal for rivet installation, and has a total grip range of from zero to 10/16 inches. The grip range of the gauge depicted may be increased by selecting an increased angle during construction (at the expense of reduced scale magnification), by increasing the size of the gauge, or by use of interchangeable slides with longer hooks.

FIG. 2 is an elevational view of a gauge configuration providing extending grip range without sacrificing scale magnification. Frame 1a having integral scales 3a and 4a of equal linear dimension, and slot 5a, is fitted with slide 2a having integral hooks 6a and 7a of different lengths so that scale 3a and hook 6a provide extended grip measuring capability. Surface 8a and 9a are parallel so that a chosen slot angle will provide the same scale magnification for scale 3a and 4a. The gauge depicted will measure from zero to 10/16" using scale 4a and hook 7a, and from 11/16" to 20/16" using scale 3a and hook 6a.

FIG. 3 is an elevational view of a gauge configuration providing two hooks, one yielding exaggerated scale magnification while the other less magnified scale. Frame 1b, having integral scales 3b and 4b of unequal linear dimension, and slot 5b, is fitted with slide 2b having integral hooks 6b and 7b of different lengths. Surfaces 8b and 9b are not parallel. The angle of slot 5b with respect to these surfaces is selected during construction to provide desired scale magnification and grip range. The gauge depicted has a slot angle of 14.5 degrees with respect to surface 9b and measures zero through 6/16" with a scale magnification of 4 times. Angle of slot with respect to surface 8b can be varied during construction to achieve desired measuring characteristics. The gauge depicted measurers zero through 20/16" at a slight scale magnification using scale 3b and hook 6b.

FIG. 4 is an elevational view of the reverse side of FIG. 1 showing that by the addition of indicator (7), fastened through slot (4) to slide (2) in a manner permitting both to slide together the length of the slot, additional scales of different linear dimension may be utilized to increase versatility of the gauge. Indicator (7) is constructed from sheet material nominally 0.030" thick. Reference edge (8) is used to read the scales.

I claim:

1. A gauge having two members one moveable relative to the other and having a straight edge portion thereon, a straight scale on said member having the straight edge portion, and at an angle to said straight edge, the other member having at least one gauge portion moveable at an angle relative to said straight scale wherein relative movement between the members indicates on the gauge the relative distance between the straight edge portion and the gauge portion.

2. A gauge having a first component and another component which are slideably, moveably connected to one another, wherein said first component has a straight scale thereon and wherein said other component slides relative to the first component, the sliding movement of the first component relative to the other component being at an angle to the straight scale on the first component, the other component having a gauge end portion extending beyond said first component which gauge end portion approaches said first component when said other component slides relative to the first component in one direction and which other component also has a scale portion displaced from said gauge end portion which cooperates with said straight scale to indicate the relative distance between the gauge end portion and the first component.

* * * * *